(12) United States Patent
Emerson et al.

(10) Patent No.: US 12,105,859 B2
(45) Date of Patent: Oct. 1, 2024

(54) MANAGING STORAGE OF SECRETS IN MEMORIES OF BASEBOARD MANAGEMENT CONTROLLERS

(71) Applicant: HEWLETT PACKARD ENTERPRISE DEVELOPMENT LP, Houston, TX (US)

(72) Inventors: Theodore F. Emerson, Houston, TX (US); Shiva R. Dasari, Houston, TX (US); Luis E. Luciani, Jr., Houston, TX (US); Kevin E. Boyum, Roseville, CA (US); Naysen J. Robertson, Roseville, CA (US); Robert L. Noonan, Crystal Lake, IL (US); Christopher M. Wesneski, The Colony, TX (US); David F. Heinrich, Houston, TX (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 331 days.

(21) Appl. No.: 17/452,722

(22) Filed: Oct. 28, 2021

(65) Prior Publication Data
US 2023/0134324 A1     May 4, 2023

(51) Int. Cl.
G06F 21/78      (2013.01)
G06F 21/33      (2013.01)
G06F 21/53      (2013.01)
G06F 21/60      (2013.01)

(52) U.S. Cl.
CPC .............. *G06F 21/78* (2013.01); *G06F 21/33* (2013.01); *G06F 21/53* (2013.01); *G06F 21/602* (2013.01)

(58) Field of Classification Search
CPC .......... G06F 21/78; G06F 21/33; G06F 21/53; G06F 21/602
See application file for complete search history.

(56) References Cited

U.S. PATENT DOCUMENTS

| | | |
|---|---|---|
| 8,832,465 B2 | 9/2014 | Gulati et al. |
| 10,691,837 B1 | 6/2020 | Martel et al. |
| 10,902,133 B2 | 1/2021 | Williams et al. |
| 2013/0099891 A1* | 4/2013 | Nandakumar .......... G06F 21/31 340/5.2 |
| 2020/0097657 A1* | 3/2020 | Jacquin ............... G06F 11/1433 |
| 2020/0159657 A1 | 5/2020 | Kida et al. |
| 2020/0175183 A1 | 6/2020 | Ramasamy et al. |
| 2022/0179674 A1* | 6/2022 | Goel ................... G06F 9/45558 |

OTHER PUBLICATIONS

Purcher, J., Apple Granted a Patent for a Secure Enclave Processor (Research Paper), Retrieved Feb. 26, 2021, 5 Pgs.

* cited by examiner

*Primary Examiner* — Ayoub Alata
(74) *Attorney, Agent, or Firm* — Trop, Pruner & Hu, P.C.

(57) ABSTRACT

An apparatus includes a host and a baseboard management controller. The baseboard management controller includes a semiconductor package; and the semiconductor package includes a memory, a security hardware processor; and a main hardware processor. The main hardware processor causes the baseboard management controller to serve as an agent that, independently from the host, responds to communications with a remote management entity to manage the host. The security hardware processor manages the storage of a secret of the host in the memory.

17 Claims, 8 Drawing Sheets

MANAGING STORAGE OF SECRETS IN MEMORIES OF BASEBOARD MANAGEMENT CONTROLLERS

BACKGROUND

A computer platform (e.g., a server) may include a specialized service processor, called a "baseboard management controller," or "BMC," which monitors the physical state of the computer platform. The BMC may communicate with a remote management server through a management network for purposes of reporting information about the computer platform to the remote management server and allowing the remote management server to control actions that are performed by the BMC. As examples of its roles, the BMC may monitor sensors (e.g., temperature sensors, cooling fan speed sensors); monitor an operating system status; monitor power statuses; log computer system events; perform remotely-controlled computer platform functions (e.g., powering up and powering down the computer platform); and so forth.

DETAILED DESCRIPTION

A BMC may execute a set of firmware instructions, called a "firmware management stack," for purposes of performing a variety of management-related functions for a computer platform. As examples, the BMC may provide such management-related functions as operating system runtime services; resource detection and initialization; and pre-operating system services. The management-related functions may also include remote management functions for the computer platform. As examples, the remote management functions may include keyboard video mouse (KVM) functions; virtual power functions (e.g., remotely activated functions to remotely set a power state, such as a power conservation state, a power on, a reset state or a power off state); virtual media management functions; and so forth.

In addition to providing management functions for the computer platform, the BMC may provide security-related features that protect the computer platform against security compromises. For example, the BMC may include a hardware (or "silicon") Root of Trust (RoT) engine, or "SRoT engine," for the computer platform. The SRoT engine may validate the firmware of the computing platform in various ways. For example, the firmware of the computing platform may be validated as a chain of validated firmware portions. For example, a hardware SRoT engine may validate a portion of the firmware in hardware, loading it into a secure enclave of the BMC. The secure enclave may then execute the validated portion of firmware to further validate a second portion of firmware, and so on, establishing a chain of trust. The firmware validation may be performed by a single entity (e.g., solely as a function of a secure enclave) or by different entities, assuming each entity is executing only previously validated portions of firmware. For example, the second portion of firmware in the previous example may be additional firmware needed by a secure enclave. This second portion is used to validate a third portion which may correspond to machine readable instructions for a BMC. This third portion may validate a fourth portion which may correspond to machine readable instructions for host system firmware, such as Unified Extensible Firmware Interface (UEFI) firmware.

The BMC is a relatively complex subsystem that may execute millions of instructions of the firmware management stack, even before the remainder of the computer platform is powered on. Although the BMC may verify the integrity of the firmware management stack before the BMC loads and executes the stack, the relatively large number of instructions of the stack potentially exposes the computer platform to latent, or undiscovered, security vulnerabilities. Due to the lack of transparency in proprietary management stacks that may potentially have undiscovered security vulnerabilities, customers for computer platforms may want to manage the computer platforms using open-source firmware management stacks. Moreover, a given customer may want to use the same open-source firmware management stack to manage all of the customer's computer platforms, regardless of the particular vendor(s) for these platforms. The open-source firmware management stack may be, as an example, firmware that is developed as part of the OpenBMC community, such as, release version 2.7 or later versions.

When allowing a customer to provide the BMC's firmware management stack, the BMC may face challenges in providing security features for the computer platform. For example, a potential security feature for the BMC may be a memory to store secrets of the computer platform. As examples, a "secret" may be a cryptographic key, a certificate, a password, a token, a seed, a cryptographic identity for the platform, and so forth. Without appropriate measures in place, the secrets may be exposed to the firmware management stack and therefore, may be susceptible to security vulnerabilities of the firmware management stack.

In accordance with example implementations that are described herein, a management controller for a computer platform, such as a BMC, provides security features for the computer platform; executes a firmware management stack; and isolates the security features from the firmware management stack. Depending on the particular implementation, the firmware management stack may be a non-proprietary open-source firmware stack; a firmware stack otherwise provided by a computer platform customer; a proprietary firmware stack; and so forth. In accordance with example implementations, as part of its security features, the BMC provides a memory (called a "secure memory" herein) to securely store secrets for the computer platform. As an example, the secure memory may be a non-volatile random access memory (NVRAM) in which secrets may be stored, read, erased and modified. In accordance with example implementations, the BMC strictly regulates access to the secure secrets.

In accordance with some implementations, the BMC provides a management plane and a security plane, which is isolated from the management plane. The firmware management stack executes in the management plane. The components in the BMC's security plane, in accordance with example implementations, are isolated by a fire wall from other components of the computer platform. In this context, a "fire wall" refers to a communication barrier through which communication is tightly controlled. As an example, in accordance with some implementations, communication through the fire wall may be regulated through the use of a security services application programming interface (API).

More specifically, in accordance with example implementations, the BMC's security plane includes a secure enclave, and the secure enclave includes a secure memory that may store one or multiple secrets for the computer platform. The secrets may include secrets of the host, and the secrets may include secrets of the BMC. In this context, a "secure enclave" refers to a subsystem of the BMC for which access into and out of the subsystem is tightly controlled. In accordance with example implementations, the secure enclave performs cryptographic functions for the computer platform and is fully disposed inside a cryptographic boundary. A "cryptographic boundary" in this context refers to a continuous boundary, or perimeter, which contains the logical and physical components of a cryptographic subsystem, such as BMC components that form the secure enclave. A "host" refers to components (e.g., one or multiple central processing unit (CPU) cores and a system) of the computer platform, which perform at least one of providing an operating system (e.g., a Linux operating system) to create an operating system environment for the computer platform or providing a pre-boot environment (e.g., provide a basic input/output system (BIOS) and/or a Unified Extensible Firmware Interface (UEFI)) to prepare the computer platform for the operating system environment.

Because the secure enclave is protected by a cryptographic boundary, access to secrets that are stored in the secure memory may be tightly controlled. In accordance with example implementations, the secure enclave may provide one or multiple APIs (called "secret management APIs" herein) for managing the secrets that are stored in the secure memory. In this manner, as examples, in accordance with some implementations, the secret management APIs may provide access functions for managing the secrets, such as APIs for reading secrets; writing secrets; deleting or clearing secrets; binding, or sealing, secrets to particular platform configuration register (PCR) states; unbinding, or unsealing, secrets based on particular PCR states; creating secrets; storing secrets; and so forth.

The BMC's management plane (and in particular, one or multiple main processing core(s) of the management plane) may serve as a proxy for the secure enclave for secret management-related exchanges, or sessions, between the host and the secure enclave. As used herein, a "proxy" for a given component (such as the secure enclave) refers to a relay or intermediary component that acts on behalf of the given component. Serving as a proxy for the secure enclave, the BMC's management plane may receive calls, or requests, from requestors (e.g., a UEFI or an operating system) to the secret management APIs and forward the requests to the secure enclave for processing. Moreover, as serving as the proxy, the BMC's management plane may further forward responses to these requests from the secure enclave to the requestors.

In accordance with example implementations, in addition to the secure memory, the secure enclave may include a number of other components. For example, in accordance with some implementations, the secure enclave may include a security processor (e.g., one or multiple hardware processing cores to execute firmware instructions to process the secret management API requests, validate firmware and perform other security-related tasks); a volatile memory (e.g., a memory to store firmware that is loaded into the volatile memory and executed by the security processor); a secure bridge to control access to the secure enclave and control outgoing communications from the secure enclave; cryptographic processing peripheral device (e.g., cryptographic accelerators, a random number generator, a tamper detection circuit, and so forth); and a silicon Root of trust (SRoT) engine.

In accordance with example implementations, the main processing core(s) of the BMC (which execute the firmware management stack) and the secure enclave may be disposed inside a semiconductor package (or "chip"). The semiconductor package may be any of numerous types of packages, such as a surface mount package, a through-hole package, a ball-grid array package, a small outline package, a chip-scale package, and so forth. Moreover, depending on the particular implementations, the components of the secure enclave may be fabricated in one or multiple die of the semiconductor package.

As a more specific example, in accordance with some implementations, all of the components of the secure enclave may be fabricated in two semiconductor die of the semiconductor package. The secure memory may be fabricated in a first semiconductor die, and the remaining components of the secure enclave may be fabricated in another, second semiconductor die. Moreover, in accordance with example implementations, components (e.g. main processing cores(s), a memory, and so forth) of the BMC's management plane may also be fabricated in the second semiconductor die.

In accordance with a further example implementation, all of the components of the secure enclave may be fabricated in a single semiconductor die. Moreover, components of the BMC's management plane may also be fabricated in this single semiconductor die.

Regardless of the particular implementation, in accordance with example implementations, the terminals (e.g., address, data and control terminals) of the secure memory may be completely embedded in the semiconductor package so that none of the terminals maybe exposed outside of the semiconductor package. Therefore, the secure memory may be highly resistant to physical tampering (e.g., tampering involving the use of physical probes and a logic analyzer), as well as other types of tampering (e.g., tampering using vulnerabilities of the firmware management stack).

Figure 1:
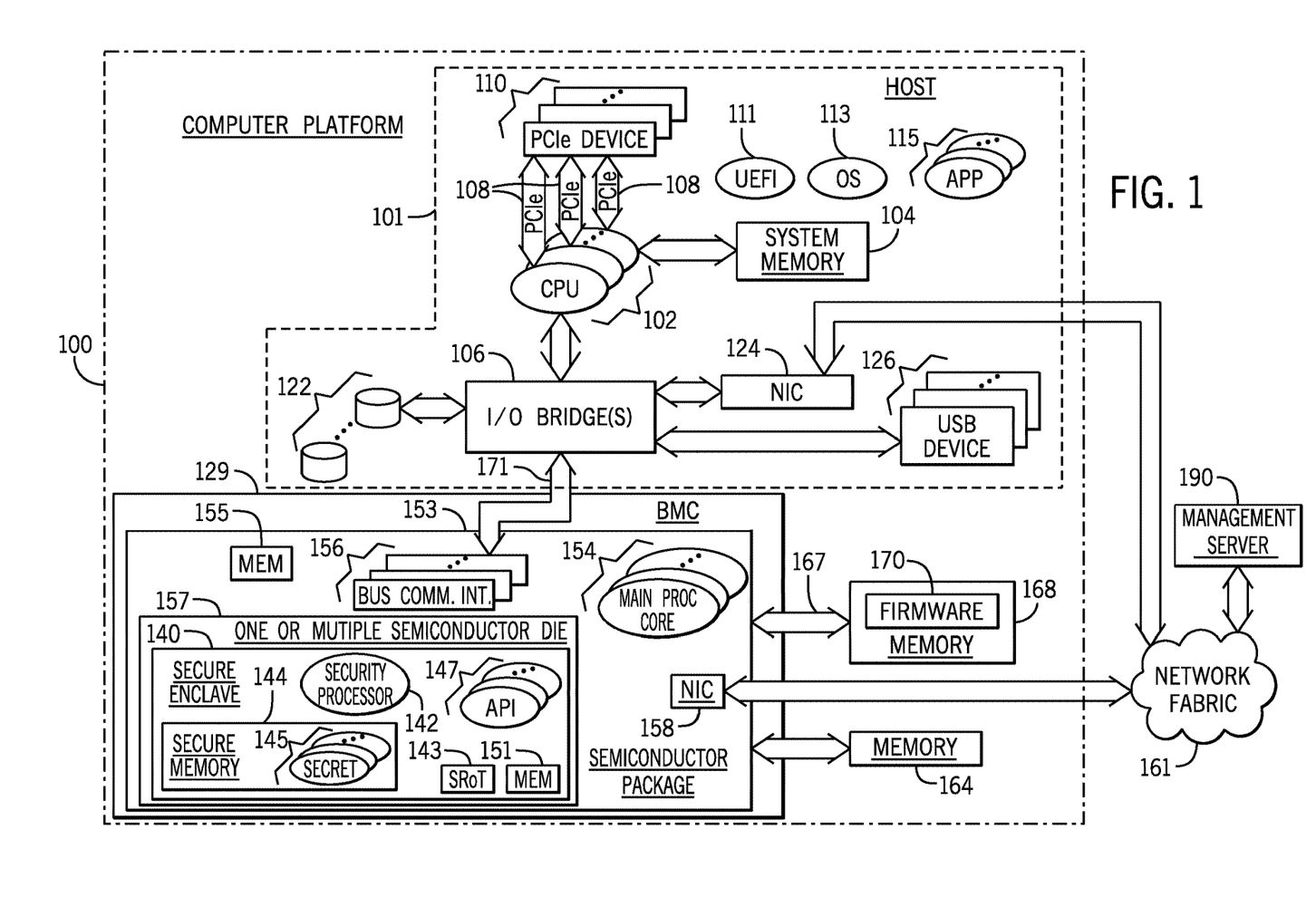
FIG. 1 is a schematic diagram of a computer platform having a baseboard management controller (BMC) that includes a secure memory to store secrets according to an example implementation.

Referring to FIG. 1, as a more specific example, in accordance with some implementations, a computer platform 100 includes a management controller (or "service processor"), such as a BMC 129. The BMC 129 includes a secure memory 144 that is located in a secure enclave 140 of the BMC 129. The secure memory 144 may store one or multiple secrets 145 for the computer platform 100.

A host 101 of the computer platform 100 may manage the secrets 145 using one or multiple secret management APIs 147 that are provided by the secure enclave 140. For example, the secrets 145 may include one or multiple key encrypting keys, and the secret management APIs 147 may include one or multiple APIs 147 for retrieving key encrypting keys, and storing key encrypting keys.

In general, a key encrypting key (or "KEK") may be used by a self-encrypting storage device 122 (e.g., a non-volatile memory express (NVMe) storage device) of the computer platform 100. More specifically, the storage device 122 may internally store and use a media access key to encrypt and decrypt the data that is stored on the storage device 122, and the media access key may be encrypted using a wrapping key, or KEK. The KEK may be viewed as a password, which is provided by the host 101 to the self-encrypting storage device 122 to unlock access to the device 122 in that the device 122 cannot decrypt the media access key (and therefore use the media access key to encrypt and decrypt data) without the KEK. The self-encrypting storage device 122 uses the KEK to decrypt the media encryption key, and the self-encrypting storage device 122 does not store the KEK.

Continuing the example, a UEFI 111 of the host 101 (e.g., a CPU core 102 executing UEFI instructions) may, at boot time of the computer platform 100, detect the presence of the self-encrypting storage device 122 and perform credential management for the device 122. This credential management may include the UEFI 111 performing such actions as determining whether a KEK has been set up for the self-encrypting storage device 122. If the KEK has been set up, the UEFI 111 calls a secret management API 147 to retrieve the KEK from the secure memory 144 so that the UEFI 111 may provide the retrieved KEK to the drive 122.

As described further herein, in accordance with further implementations, a secret 145 may be a secret other than a KEK. In general, a "secret," as used herein, refers to data that represents a security-protected entity, or artifact, such as a cryptographic key, a credential, a certificate, a measurement hash, a cryptographic platform identity, a seed, a password, and so forth. "Managing" a secret 145, in general, refers to controlling, or regulating, aspects related to storing and accessing the secret 145, such as reading, or retrieving, the secret 145 from the secure memory 144; writing the secret 145 to the secure memory 144; generating a secret 145 to be stored in the secure memory 144 (e.g., generating a cryptographic key); deleting the secret 145 from the secure memory 144; sealing a secret 145 to one or multiple measurement hashes or one or multiple measurement digest values (e.g., PCR values); unsealing the secret 145; and so forth.

A blade server is an example of the computer platform 100, in accordance with an example implementation. The computer platform 100 may, however, be a platform other than a blade server, in accordance with further implementations, such as a rack-mounted server, a storage array, a modular switch, a portable computer, a smartphone, a client, a desktop and so forth.

Regardless of its particular form, the computer platform 100 includes hardware that is capable of processing machine-executable instructions, and a frame, or chassis, to which the hardware is mounted. For example, the computer platform 100 may include one or multiple motherboards that may be mounted to a chassis, and each motherboard may contain one or multiple multicore CPU semiconductor packages (or "sockets" or "chips"). As an example, for implementations in which the computer platform 100 is a blade server, the blade server may have a form factor, one or multiple mechanical latches, and corresponding electrical connectors for purposes of allowing the blade server to be installed in and removed from a corresponding server blade opening, or slot, in a rack-mounted blade enclosure.

As used herein, a "BMC," or "baseboard management controller," is a specialized service processor that monitors the physical state of a server or other hardware using sensors and communicates with a management system through a management network. The baseboard management controller may also communicate with applications executing at the operating system level through an input/output controller (IOCTL) interface driver, a representational state transfer (REST) application program interface (API), or some other system software proxy that facilitates communication between the baseboard management controller and applications. The baseboard management controller may have hardware level access to hardware devices that are located in a server chassis including system memory. The baseboard management controller may be able to directly modify the hardware devices. The baseboard management controller may operate independently of the operating system of the system in which the baseboard management controller is disposed. The baseboard management controller may be located on the motherboard or main circuit board of the server or other device to be monitored. The fact that a baseboard management controller is mounted on a motherboard of the managed server/hardware or otherwise connected or attached to the managed server/hardware does not prevent the baseboard management controller from being considered "separate" from the server/hardware. As used herein, a baseboard management controller has management capabilities for sub-systems of a computing device, and is separate from a processing resource that executes an operating system of a computing device. The baseboard management controller is separate from a processor, such as a central processing unit, which executes a high-level operating system or hypervisor on a system.

In accordance with example implementations, the host 101 may include one or multiple CPU cores 102 (e.g., CPU processing cores, semiconductor containing CPU processor cores, and so forth), and memory devices that connected to the CPU(s) 102 to form a system memory 104. The CPU cores 102 may be coupled to one or multiple input/output (I/O) bridges 106, which allow communications between the CPU cores 102 and the BMC 129, as well as communications with various I/O devices, such as storage drives 122; one or multiple network interface controllers (NICs) 124; one or multiple Universal Serial Bus (USB) devices 126; I/O devices; a video controller; and so forth. Moreover, as also depicted in FIG. 1, the computer platform 100 may include one or multiple Peripheral Component Interconnect Express (PCIe) devices 110 (e.g., PCIe expansion cards) that may be coupled to the CPU cores 102 through corresponding individual PCIe bus(es) 108. In accordance with a further example implementation, the PCIe device(s) 110 may be coupled to the I/O bridge(s) 106, instead of being coupled to the CPU cores 102. In accordance with yet further implementations, the I/O bridge(s) 106 and PCIe interfaces may be part of the CPU core 102.

In accordance with example implementations, a one of multiple memory modules of the computer platform 100 may form a non-volatile memory 168 that stores firmware 170. As depicted in FIG. 1, in accordance with some implementations, the non-volatile memory 168 may be coupled by a bus 167 (e.g., a Serial Peripheral Interconnect (SPI) bus) to components of the BMC 129. In accordance with example implementations, the firmware 170 contains instructions that are executed by a hardware security processor 142 of the secure enclave 140 of the BMC 129 (as part of the BMC's security plane); instructions that are executed by general processing core(s) 154 of the BMC 129 (i.e., the firmware stack corresponding to the management plane of the BMC 129); and instructions that are executed by the CPU(s) 102 to boot the computer system 100 and provide runtime services.

In general, the memory devices that form the system memory 104, the firmware memory 168, as well as other memories and storage media that are described herein, may be formed from non-transitory memory devices, such as semiconductor storage devices, flash memory devices, memristors, phase change memory devices, a combination of one or more of the foregoing storage technologies, and so forth. Moreover, the memory devices may be volatile memory devices (e.g., dynamic random access memory (DRAM) devices, static random access (SRAM) devices, and so forth) or non-volatile memory devices (e.g., flash memory devices, read only memory (ROM) devices and so forth), unless otherwise stated herein.

In accordance with some implementations, one or multiple NICs 124 may be intelligent input/output peripherals, or "smart I/O peripherals," which may provide backend I/O services for one or multiple applications 115 (or application instances) that execute on the computer platform 100. In accordance with some implementations, one or multiple of the PCIe devices 110 may be smart I/O peripherals.

The BMC 129 may include a management plane and a security plane, which is isolated from the management plane. More specifically, in accordance with example implementations, the BMC 129 includes one or multiple main processing cores 154 that execute machine-executable instructions to perform management functions for the computer platform 100. These instructions may correspond to the firmware management stack of the BMC 129. As examples, by the main processing cores 154 executing the firmware management stack, the BMC 129 may perform a variety of management roles for the host 101, such as monitoring sensors; monitoring operating system status; monitoring power statuses; logging computer system events; providing a remote console; providing remotely-controlled functions and other virtual presence technologies; and so forth.

The execution of the firmware management stack by the main processing cores 154 may cause the BMC 129 to serve as an agent for the host 101 for purposes of allowing a management entity, such as remote management server 190, to remotely manage the host 101. The remote management server 190, depending on the particular implementation, may be physical located in another rack, blade server, data center and/or geographical location than the computer platform 100. As an example of the BMC 129 serving as an agent for the host 101 to allow remote management of the host 101, the BMC 129 may provide a remote console for the host 101 for a variety of purposes, such as providing KVM functions, virtual power functions, virtual media management functions, and so forth. The remote management server 190 may communicate with the BMC 129 via network fabric 161 even when the host 101 is powered down and even when software has not yet been installed on the host 101. As further examples of the BMC 129 serving as an agent for the host 101, the remote management server 190 may communicate with the BMC 129 via the network fabric 161 to receive state information (e.g., temperature sensor readings, tamper sensor readings, boot status, fault indications, security check faults, and so forth) about the host 101; set up virtual media for the host 101; power up the host 101; power down the host 101; initiate a recovery action for the host 101 (e.g., initiate an operating system recovery); set a boot path for the host 101; and so forth. In accordance with example implementations, the secure enclave 140 of the BMC 129 may provide platform manifests (e.g., manifests representing integrity measurements of software components and hardware component identities) to the remote management server 190 so that the server 190 may validate the platform manifests.

Moreover, in accordance with some implementations, the remote management server 190 may communicate with the BMC 129 for purposes of controlling whether the computer platform 100 is able to "join the fleet," or become active on a network of other platforms (e.g., a network of servers). For example, responsive to the computer platform 100 booting, as part of a request to join the fleet, the UEFI 11 or OS 113 may request (e.g., a security service API request) for the secure enclave 140 to provide a key to the remote management server 190, which allows the computer platform 100 to join the fleet. As an example, the key may be a signed manifest of the BMC 129 and other hashes, a hardware identity certificate (e.g., an IDevID certificate) and a nonce (to prevent replays). In response to the request API call corresponding to the request for the key, the secure enclave 140 may extract the requisite hashes, extract the hardware identity certificate, generate the key, and provide the key to the remote management server 190.

In general, the network fabric 161 may be associated with one or multiple types of communication networks, such as (as examples) Fibre Channel networks, Gen-Z fabrics, dedicated management networks, local area networks (LANs), wide area networks (WANs), global networks (e.g., the Internet), wireless networks, or any combination thereof.

In accordance with example implementations, the CPU cores 102 execute machine executable instruction (i.e., "software") to form one or multiple components that may call on the secret management APIs 147 to manage secrets 145 that are stored in the secure memory 144. As examples, these components may include the UEFI 111, a basic input/output system (BIOS), an operating system 113 and applications 115. In this context, an "API" is a software interface associated with a set of rules pertaining how an entity may request, or call, one or multiple functions that are provided by the software interface. A requestor may submit an API call, or request, to a secret management API 147 for purposes of managing a secret 144.

The API call may include data representing a command (e.g., a write or read command) to manage a secret 144; one or multiple parameters of the command; an identifier of the secret 144; credentials of the requestor making the API call; and so forth. In accordance with example implementations, the secret management APIs 147 may provide secure storage services for purposes of managing the storage of the secure secrets 145 in the secure memory 144.

As examples of the storage services provided by the secret management APIs 147, the secret management APIs 147 may provide services for purposes of storing measurement hashes, loading reference measurement hashes, constructing at least part of a root of trust measurement chain, storing cryptographic keys, retrieving cryptographic keys, generating cryptographic keys, validating a firmware image, retrieving a cryptographic platform identity, creating certificates, storing certificates, adding certificates, deleting certificates, sealing cryptographic keys, unsealing cryptographic keys and so forth. As examples, in accordance with example implementations, API requests may be Redfish API requests, Intelligent Platform Management Interface (IPMI) API requests; or other API requests.

An API request and a corresponding API response are associated with a session, or exchange, between the requestor (e.g., an entity of the host 101, such as the operating system 113 or the UEFI 111) and the "responder," or secure enclave 140. In accordance with example implementations, the processing core(s) 154 of the BMC 129 (as part of the BMC's management plane) may serve as a proxy for the secure enclave 140 (and for the security processor 142) to communicate API requests from requestors to the secure enclave 140 and to communicate the corresponding responses from the secure enclave 140 to the requestors. For example, a requestor may write data that represents a request corresponding to a particular secret management API 147 to a memory space that is associated with the BMC's management plane. The processing core(s) 154 may then communicate with the secure enclave 140 to forward the request to the secure enclave 140 for processing. Moreover, the processing core(s) 154 may communicate with the secure enclave 140 to receive the response to the request and then communicate the response to the requestor.

For purposes of ensuring a requestor that tampering has not occurred with the exchange, at least one of the request or the response may be "wrapped." In this context, the "wrapping" of a request or a response refers to applying cryptography-based security protection to the request or response.

As a more specific example of wrapping, a requestor may apply asymmetric encryption using a public key to encrypt content that corresponds to one or multiple predefined fields or parameters (e.g., a requestor identifier, a command, and so forth) of an API call to form corresponding ciphertext. The public key may be part of a (public key, private key) pair that is used with an asymmetric cipher, and the secure enclave 140 may own the private key. The requestor includes the ciphertext in the request, and the secure enclave 140 decrypts the ciphertext using the private key. In this way, an entity other than the secure enclave 140 (who owns the private key) cannot decrypt the encrypted content of the request. In accordance with further implementations, the requestor may generate a session key and use a symmetric cipher (instead of the above-described asymmetric cipher) to encrypt the predefined field(s) or parameter(s) of the API call to form corresponding ciphertext. For these implementations, the requestor may encrypt the session key with the public key (of the (public key, private key) pair) using the asymmetric cipher and include the session key-encrypted ciphertext and the encrypted session key in the request. Responsive to the receipt of the request, the secure enclave 140 may decrypt the encrypted session key using the private key (of the (public key, private key) pair), and the secure enclave 140 may decrypt the session key-encrypted ciphertext using the session key.

Continuing the example, after decrypting the request, the secure enclave 140 may proceed with processing the request and generating a corresponding response. The secure enclave 140 may, in accordance with example implementations, sign a content (that corresponds to one or multiple predefined fields or parameters of the API response) with the private key (of the (public key, private key) pair) to generate a signature, which the secure enclave 140 includes in the response. This way, the requestor may, based on its calculation of the signature using the public key and comparison of the calculated signature to the signature included in the response, authenticate the response to verify whether the response is from the secure enclave 140. In accordance with further implementations, the secure enclave 140 may encrypt content of the response with the session key.

One or multiple secrets 145, in accordance with example implementations, may be secrets of the BMC 129, and a request to manage a secret 145 may originate with the BMC's management plane. For example, in accordance with some implementations, responsive to executing the management stack, a main processing core 154 may be a requestor and provide a request to access a secret 145. The processor core 154 may communicate data representing the request to the secure enclave 140 and receive data from the secure enclave 140 representing a response to the request. Therefore, in accordance with some implementations, the secure memory 144 may store secrets 145 of the host 101 and secrets 145 of the BMC 129.

The secure enclave 140 of the BMC 129, in accordance with example implementations, is isolated from the management plane (and other non-secure components of the BMC 129, which are outside of the secure enclave 140). In accordance with example implementations, the secure enclave 140 include a hardware, or silicon, RoT (called an "SRoT") that provides security features for the BMC 129.

More specifically, in accordance with example implementations, the secure enclave 140 stores an immutable fingerprint, which is used by the SRoT engine 143 to validate portions of the firmware 170. The BMC 129 places holds on the main processing cores 154 and the security processor 142 when the BMC 129 is powered on or reset. Responsive to the power on or reset, the SRoT engine 143 validates and then loads an initial portion of the firmware 170 into a memory 151 of the secure enclave 140 so that this firmware portion is now trusted. The BMC 129 then releases the hold on the security processor 142 to allow the security processor 142 to boot and execute the loaded firmware instructions. By executing the firmware instructions, the security processor 142 may then validate another portion of the firmware 170 that corresponds to a portion of the BMC's management firmware stack and after validation, load this portion of the firmware stack into a memory 155 of the BMC 129. The portion of the management firmware stack may then be executed by the main processing core(s) 154 (when released from reset), which causes the main processing core(s) 154 to load additional portions of the firmware 170 and place the loaded portions into a memory 164. Access to the memory 164 may involve additional training and initialization steps (e.g., training and initialization steps set forth by the DDR4 specification). Those instructions may be executed from the validated portion of the BMC's firmware management stack in the memory 155. In accordance with example implementations, the secure enclave 140 may lock the memory 155 to prevent modification or tampering with the validated portion(s) stored in the memory 155.

Therefore, in accordance with example implementations, the chain of trust may be extended from the BMC's SRoT to the firmware management stack that is executed by the BMC's main processing cores 154.

In accordance with example implementations, the BMC 129 is constructed to prevent a given domain or entity of the BMC 129 from powering up or coming out of reset until the secure enclave 140 validates the domain/entity. Moreover, in accordance with example implementations, the BMC 129 may prevent components of the BMC 129 from accessing resources of the BMC 129 and resources of the computer platform 100 until the secure enclave 140 approves/validates the resources. The BMC 129 may perform bus filtering and monitoring (e.g., bus filtering and monitoring for an SPI bus, a system management bus (SMB), an Inter-Intergrade Component ($I^2C$) bus, an Improved $I^2C$ ($I^3C$) bus, and so forth) to prevent unwanted access to bus devices. For example, the BMC 129 may perform bus filtering and monitoring for the bus 167.

In accordance with example implementations, the BMC 129 may contain a network interface controller (NIC) 158 (e.g., a semiconductor package or "chip") that allows the BMC 129 to communicate (via the network fabric 161) with entities that are external to the computer platform 100, such as the remote management server 190. The BMC 129 may further contain one or multiple additional communication interfaces 156, such as a USB interface, a PCI interface, an SPI interface, an $I^3C$ bus interface, and so forth. Moreover, in accordance with example implementations, the BMC 129 may contain components that are not specifically depicted in FIG. 1, such as a physical memory interface, a memory controller interface, a video controller, and so forth.

In accordance with example implementations, the BMC 129 includes a semiconductor package 153 (or "chip") that includes at least some of the components of the BMC 129, such as the main processing cores 154 and the secure enclave 140. The semiconductor package 153 may include one or multiple semiconductor die. In accordance with some implementations, the secure memory 144 may be fabricated in one semiconductor die, and the remaining components of the BMC 129 may be fabricated in one or multiple additional semiconductor die. In accordance with example implementations, the terminals (e.g., leads, pins, balls, and so forth), of the secure memory 144, such as the terminals used for purposes of communicating data, control and address signals with the secure memory 144, are not exposed outside of the semiconductor package 153. In other words, in accordance with example implementations, the terminals of the secure memory 144 are physically isolated from the region outside of the semiconductor package 153, which prevents physical probe tampering from being used to comprise the integrity or security of the data that is stored in the secure memory 144.

Figure 2:
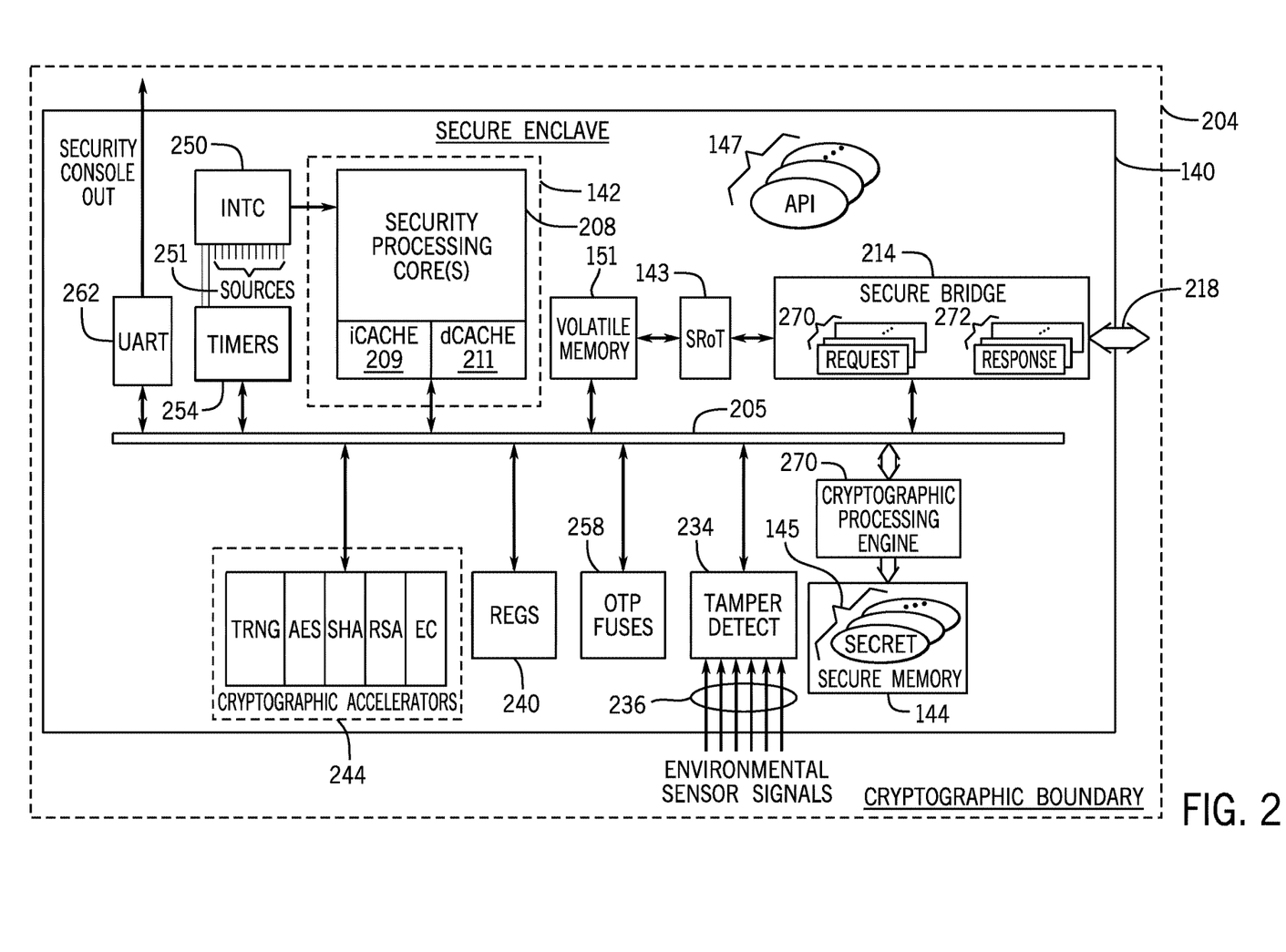
FIG. 2 is a schematic diagram of a secure enclave of a BMC, which contains a secure memory to store secrets according to an example implementation.

Referring to FIG. 2, in accordance with example implementations, the secure enclave 140 may be a complete system-on-chip (SOC) and may be contained within a tightly-controlled cryptographic boundary 204. In general, the components of the secure enclave 140 may communicate over a bus infrastructure 205. In accordance with example implementations, the bus infrastructure 205 may include such features as a data bus, a control bus, an address bus, a system bus, one or multiple buses, one or multiple bridges, and so forth. The security processor 142 may contain one or multiple processing cores 208 (e.g., CPU cores); an instruction cache 209 and a data cache 211. The volatile memory 151 may be, for example, a static random access memory (SRAM) and may store data representing trusted computing base (TCB) measurements, such as one or multiple PCR banks. The secure memory 144 may be, for example, a non-volatile RAM (NVRAM). The secure enclave 140 may include registers 240. The registers 240 may be software registers, hardware registers, or a combination of hardware and software registers, depending on the particular implementation. For example, in accordance with some implementations, the registers 240 include cryptographically secure registers, such as software PCRs. Moreover, in accordance with example implementations, the registers 240 may include operational registers, such as hardware registers that provide control, status and configuration functions for the secure enclave 140.

The secure enclave 140, in accordance with example implementations, includes a secure bridge 214 that controls access to the secure enclave 140 (i.e., establishes a fire wall for the secure enclave 140) through a security services API (e.g., a secret management API 147). Referring to FIG. 2 in conjunction with FIG. 1, in accordance with example implementations, a main processing core 154 of the BMC 129, when serving as a proxy, may write data, which corresponds to the request and is in compliance with a security services API, to a request buffer 270 of the secure bridge 214 via an interconnect 218. As examples, the interconnect 218 may be a bus 218 (e.g., an SPI bus) or an internal interconnect fabric, such as Advanced Microcontroller Bus Architecture (AMBA) fabric or Advanced eXtensible Interface (AXI) fabric. In accordance with example implementations, one or multiple security processing core(s) 208 may process the secret management request and store data in a response buffer 272. The data represents a response (e.g., a denial, an acknowledgement, data representing requested data, and so forth) to the secret management request, and a main processing core 154 may read the data from the response buffer 272 and forward the response to the requestor. In accordance with some implementations, the secure bridge 214 may verify whether the requestor has access rights for a given request (i.e., verify whether the secure bridge 214 may accept and process the request, or reject the request) based on one or multiple parameters of the request, such as parameters that represent requestor credentials (e.g., a requestor identifier and a password, key or certificate), a command, command operands and so forth. In accordance with some implementations, the security services API may be separate from the secret management APIs 147; and in accordance with further example implementations, the security services API may be part of each secret management API 147.

The secure bridge 214 may provide an additional upstream interface to allow the secure enclave 140 to "reach out" to the interconnect 218. The secure enclave 140 may use the upstream interface to obtain its firmware and, in general, to validate the firmware 170 (FIG. 1). The secure bridge 214 may employ filtering and monitoring on the interconnect 218 to prevent unauthorized access to the memory 151.

As also depicted in FIG. 2, in accordance with example implementations, the secure enclave 140 may include a tamper detection circuit 234, which receives various environmental sensor signals 236 (e.g., sensor signals representing a temperature, a clock rate, a voltage, and so forth) for purposes of detecting malicious manipulation of the secure enclave's operating environment so that appropriate action may be taken when this occurs. In this manner, in accordance with example implementations, when tampering is detected by the tamper detection circuit 234, the tamper detection circuit 234 may initiate one or multiple corrective actions by the secure enclave 140 to address the detected compromise in security. As examples, upon the tamper detection circuit 234 indicating detected tampering, the secure enclave 140 may remove sensitive information (e.g., erase certain secrets, such as erase the secrets 145 that are stored in the secure memory 144); assert a signal or message to alert an external component (e.g., a main processing core 154, the operating system 113 (FIG. 1), the remote management server 190 (FIG. 1), and so forth) to the tampering; halt or reset external the main processing core(s) 154; and so forth. In accordance with some implementations, as depicted in FIG. 2, the secure enclave 140 may include a cryptographic engine 270 that encrypts data written to the secure memory 144 and decrypts data read from the secure memory 144. Depending on the particular implementation, the encryption and decryption may use an Advanced Encryption Standard-XOR-Encrypt-XOR-Based Tweaked-Codebook Mode with Ciphertext Stealing (or "AES-XTS") block cipher, or another block cipher.

The secure enclave 140, in accordance with example implementations, may include cryptographic accelerators 244, such as symmetric and asymmetric cryptographic accelerators, which assist the security processor 142 with such operations as key generation, signature validation, encryption, decryption and so forth. Moreover, the cryptographic accelerators 244 may include a true random number generator to provide a trusted entropy source for cryptographic operations.

Among its other components, in accordance with example implementations, the secure enclave 140 may include one-time programmable (OTP) fuses 258 that store data that represents truly immutable attributes, such as a silicon root-of-trust Secure Hash Algorithm 2 (SHA-2) signature (e.g., the immutable fingerprint used by the SRoT engine 143), a unique identifier (e.g., an identifier used to seed a platform identity certificate), a security enablement fingerprint, and so forth. The secure enclave 140 may have other components that, as can be appreciated by one of ordinary skill in the art, may be present in a processor-based architecture, such as a timers 254, an interrupt controller 250 (that receives interrupt triggering stimuli from the timers 254 and other sources), and so forth.

Moreover, the secure enclave 140 may contain interfaces to aid in the initial development and debugging of the secure enclave 140 (in the pre-production mode of the secure enclave 140) but may be disabled completely or may have changed functions (for the production mode of the secure enclave 140) when certain fuses (e.g., certain OTP fuses 258) are blown. For example, these interfaces may include a Universal Asynchronous Receiver/Transmitter (UART) 262 that may be used for the debugging and development of the secure enclave 140 and then secured to a transmit only configuration for the production mode of the secure enclave 140. As an example, in accordance with some implementations, the UART 262 may be configured by the OTP fuses 258 to, in the production mode of the secure enclave 140, provide one-way status health information from the secure enclave 140. As another example, in accordance with further implementations, the OTP fuses 258 may disable the UART 262 for the production mode so that all communication with the UART 262 is disabled to prevent all communication across the cryptographic boundary 204. As another example of an interface that may aid in the initial development and debugging of the secure enclave 140 but may be modified/disabled for the production mode, the secure enclave 140 may include a Joint Test Action Group (JTAG) interface (not shown) for the security processor 142; and this JTAG interface may be disabled for the production mode of the secure enclave 140.

Figure 3:
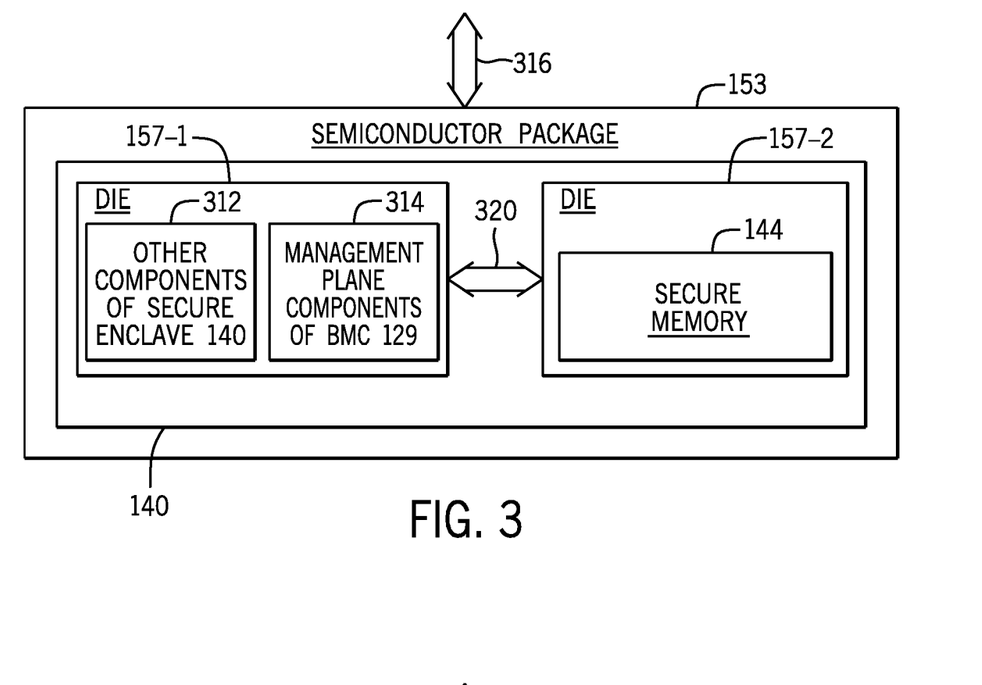
FIGS. 3 and 4 illustrate packaging of components of the BMC according to example implementations.

Referring to FIG. 3 in conjunction with FIG. 2, in accordance with example implementations, the semiconductor package 153 may contain a die 157-2 in which the secure memory 144 is fabricated. In this manner, the memory cells of the secure memory 144 and additional components of the secure memory 144 that are used for purposes of storing data in and retrieving data from the memory cells (e.g., decoding logic, encoding logic, control signal generation logic, and so forth) may be fabricated in the semiconductor die 157-2. In accordance with example implementations, the semiconductor package 153 may contain one or multiple additional die 157-1, which contain the other components of the BMC 129. For the example implementation that is depicted in FIG. 3, a semiconductor die 157-1 includes other components 312 of the secure enclave 140 and includes non-secure management plane components 314 (e.g., the main processing core(s) 154 and the memory 155) of the BMC 129.

As depicted in FIG. 3, the secure memory 144 may be coupled to the remainder of the secure enclave 140 through an interconnect 320 between the die 157-1 and 157-2. In accordance with some implementations, the interconnect 320 may correspond to the physical communication interface between the cryptographic processing engine 270 (see FIG. 2) and the secure memory 144. The interconnect 320 is disposed with the semiconductor die 153 and cannot be directly accessed outside of the semiconductor package 153. Due to this arrangement, none of the address, data or control terminals of the secure memory 144 are exposed outside of the semiconductor package 153. In other words, the semiconductor package 153 may have external terminals 316, but none of these terminals 316 may be probed to snoop on communications with the secure memory 144. Therefore, the arrangement depicted in FIG. 3 may provide an additional degree of protection for the data stored in the secure memory 144.

Figure 4:
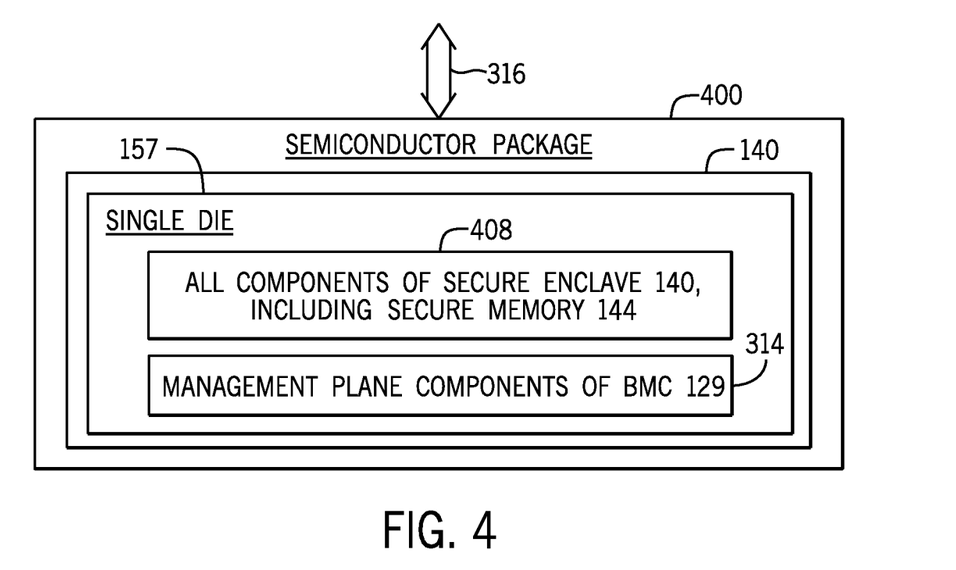

Referring to FIG. 4 in conjunction with FIG. 2, in accordance with a further example implementation, as depicted at reference numeral 408, all of the components of the secure enclave 140, including the secure memory 144, may be fabricated in a single die 157 of a semiconductor package 400 (that replaces the semiconductor package 153). The main processing cores 154 (FIG. 2) may, for example, be fabricated in another die of the semiconductor package 400. In accordance with further example implementations, the semiconductor package 400 may include multiple semiconductor die, and for these example implementations, the secure memory 144 may not be segregated into a separate die from the other components of the secure enclave 140. In accordance with yet further example implementations, the main processing cores 154 and all of the components of the secure enclave 140 are fabricated in a single semiconductor die of a semiconductor package. As such, many implementations are contemplated, which are within the scope of the appended claims.

Referring back to FIG. 1, in accordance with example implementations, a storage device 122 may be an NVMe storage device, and the secure memory 144 may store data representing a key encrypting key (i.e., a secure secret 145) for the NVMe storage device 122. In accordance with some implementations, a CPU core 102 executing boot services firmware (e.g., UEFI 111 boot services firmware) may, responsive to the boot of the computer platform 100, detect the NVMe storage device 122 and perform credential management for the storage device 122. Referring to FIG. 2 in conjunction with FIG. 1, as part of this credential management, the CPU core 102 may submit an API call, or request, to the secure enclave 140 requesting the key encrypting key for the NVMe storage device 122. In this manner, the CPU core 102 may submit a request that is associated with a particular secret management API 147 and contains a command requesting the key encrypting key, an identifier for the NVMe drive 122, security credentials, and so forth. The secure bridge 214 and a security processing core 208 of the secure enclave 140 may process the request and provide a corresponding response.

Figure 5:
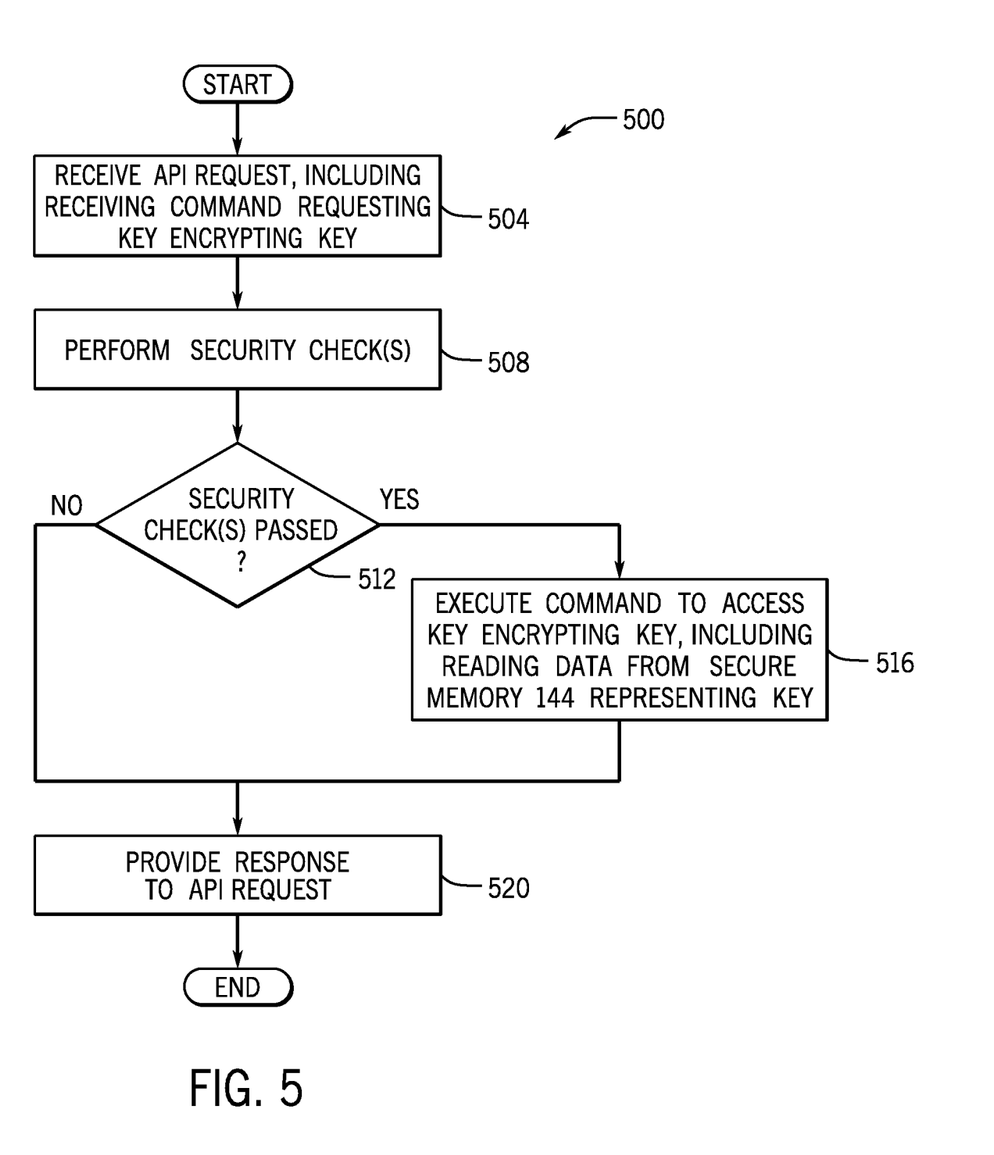
FIG. 5 is a flow diagram depicting a process used by a secure enclave of a BMC to process an application programming interface (API) request for a key encrypting key that is stored in a secure memory of the secure enclave according to an example implementation.

More specifically, referring to FIG. 5 in conjunction with FIGS. 1 and 2, in accordance with example implementations, the secure enclave 140 may perform a process 500 to process a request for accessing a secret 145, where the secret 145 is a key encrypting key (or "KEK"). Pursuant to block 504, the process 500 includes the secure enclave 140 receiving an API request, which includes a command to request a KEK. The secure enclave 140 may perform (block 508) one or multiple security checks for the API request. For example, the secure bridge 214 may verify whether the requestor has the appropriate credentials for submitting an API request to the secure enclave 140; a security processing core 208 may execute instructions to verify whether the requestor has an access privilege for requesting a KEK; and so forth. Responsive to the secure enclave 140 determining (decision block 512) that the security check(s) have been passed, the security processing core 208 may then, pursuant to block 516, execute instructions to cause the processing core 208 to execute the command included in the API request to access the KEK. The execution of the command may include the processing core 208 reading data from the secure memory 144, which represents the KEK. Pursuant to block 520, the security enclave 140 may then provide a response to the API request, such as, providing the KEK, denying the API request, providing a response that a KEK was not found, and so forth.

Figure 6:
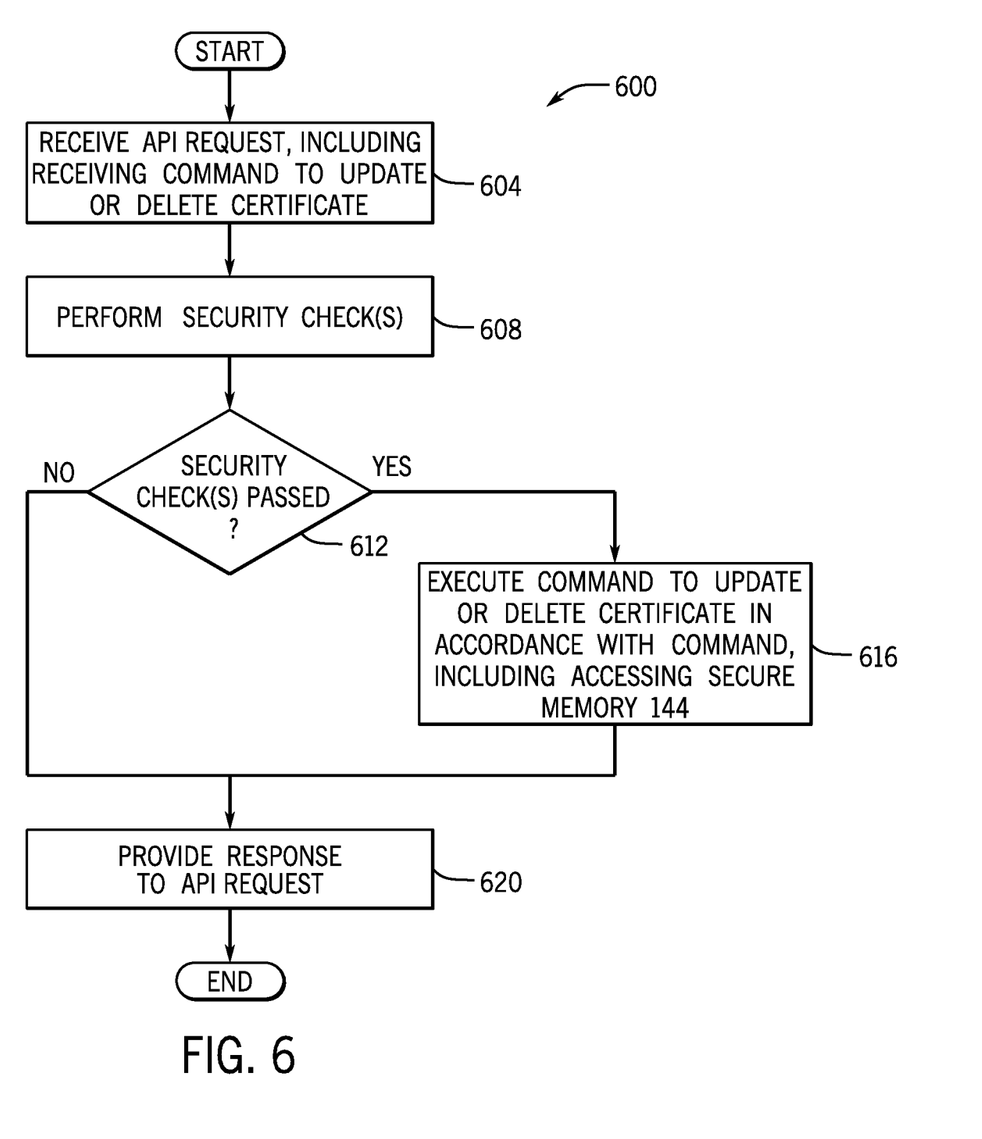
FIG. 6 is a flow diagram depicting a process used by a secure enclave of a BMC to process an API request to update or delete a certificate that is stored in a secure memory of the secure enclave according to an example implementation.

As another example, a secure secret 145 may be a certificate, and the secure enclave 140 may perform a process 600 that is depicted in FIG. 6 for purposes of updating or deleting the certificate. As examples, a particular API request may be directed to updating a certificate associated with the remote management server 190, updating a certificate associated with the computer platform 100, updating a root certificate, updating an intermediate certificate, deleting a certificate, and so forth.

Referring to FIG. 6 in conjunction with FIGS. 1 and 2, in accordance with some implementations, the process 600 includes the secure enclave 140 receiving (block 604) an API request, which includes a command to request an update or deletion of a certificate. The secure enclave 140 may perform one or multiple security checks for the API request, pursuant to block 608. These security checks may be performed by the secure bridge 214 and/or a security processing core 208. For example, the secure bridge 214 may serve as a secure enclave gatekeeper to verify whether the requestor has the appropriate credentials for submitting an API request to the secure enclave 140; a security processing core 208 may execute instructions to verify whether the requestor has an access privilege for requesting the update or deletion of the certificate; and so forth. Responsive to the secure enclave 140 determining (decision block 612) that the security check(s) have passed, the security processing core 208 may then, pursuant to block 616, execute instructions to cause the processing core 208 to execute the command included in the API request to update or delete the certificate. Pursuant to block 620, the security enclave 140 may then provide a response to the API request, such as, acknowledging deletion of the certificate, acknowledging an update to the certificate, denying the API request, providing a response that the certificate was not found, and so forth.

Referring to FIG. 2, as another example of secure secrets 145 and the secret management APIs 147, in accordance with further implementations, a particular secret management API 147 may relate to the sealing or unsealing of a cryptographic key (i.e., the secret 145). For example, in accordance with some implementations, the volatile memory 151 of the secure enclave 140 may store data representing TCB measurements, such as PCR measurements. Moreover, the operating system 113 (FIG. 1) of the computer platform 100 may perform operations that are bound to the TCB measurements. For example, the operating system 113 may use the TCB measurements to seal KEK to a particular state of the computer platform 100, such as binding a key encrypting hard disk encryption key to a particular set of PCR values. The "sealing" refers to the secure enclave 140 encrypting the KEK to the PCR values, such that the secure enclave 140 does not otherwise unseal, or decrypt, the KEK and provide the hard disk encryption key to the operating system 113 if current PCR values do not match the PCR values to which the KEK is sealed.

As another example of secure secrets 145 and the secret management APIs 147, in accordance with further implementations, a particular secret management API 147 may relate to sealing or unsealing of a password (i.e., the secret 145) to a particular set of PCR values. For example, the operating system 113 (FIG. 1) may seal a password to a particular set of PCR values to allow the sealed password be to the UEFI 111 (FIG. 1) after a reboot of the computer platform 100. Therefore, for this example, the secret management APIs 147 may include an API to seal a password to a set of PCR measurements and an API 147 to unseal a password based on a supplied set of PCR measurements.

In a similar manner, in accordance with some implementations, the secure secret 145 may be a virtual private network (VPN) key, and the secret management APIs 147 may include an API 147 to seal a VPN key to a set up PCR measurements and an API 147 to unseal a VPN key based on a supplied set of PCR measurements As other examples, in accordance with further implementations, the secure secret 145 may be a file, a generated random number, a key, a hash, a public key, a private key, a password, and so forth. Regardless of its particular form, the secure secret 145 may be securely accessed by a requestor using one or multiple secret management APIs 147.

Figure 7:
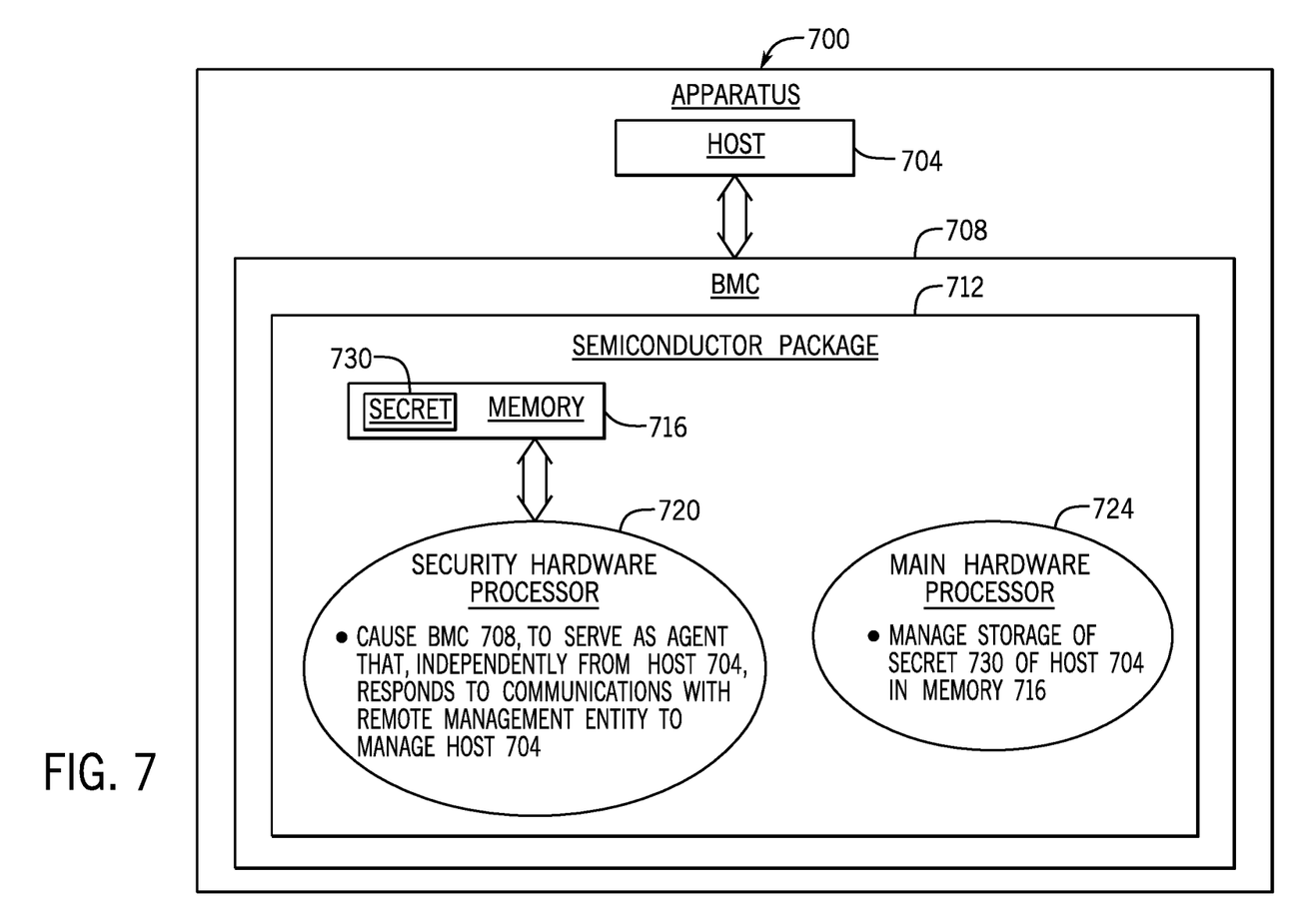
FIG. 7 is a schematic diagram of an apparatus that includes a BMC that manages the storage of a secret of a host of the apparatus according to an example implementation.

Referring to FIG. 7, in accordance with example implementations, an apparatus 700 includes a host 704 and a baseboard management controller 708. The baseboard management controller 708 includes a semiconductor package 712; and the semiconductor package 712 includes a memory 716, a security hardware processor 720; and a main hardware processor 724. The main hardware processor 724 causes the baseboard management controller 708 to serve as an agent that, independently from the host 704, responds to communications with a remote management entity to manage the host 704. The security hardware processor 720 manages the storage of a secret 717 of the host 704 in the memory 716.

Figure 8:
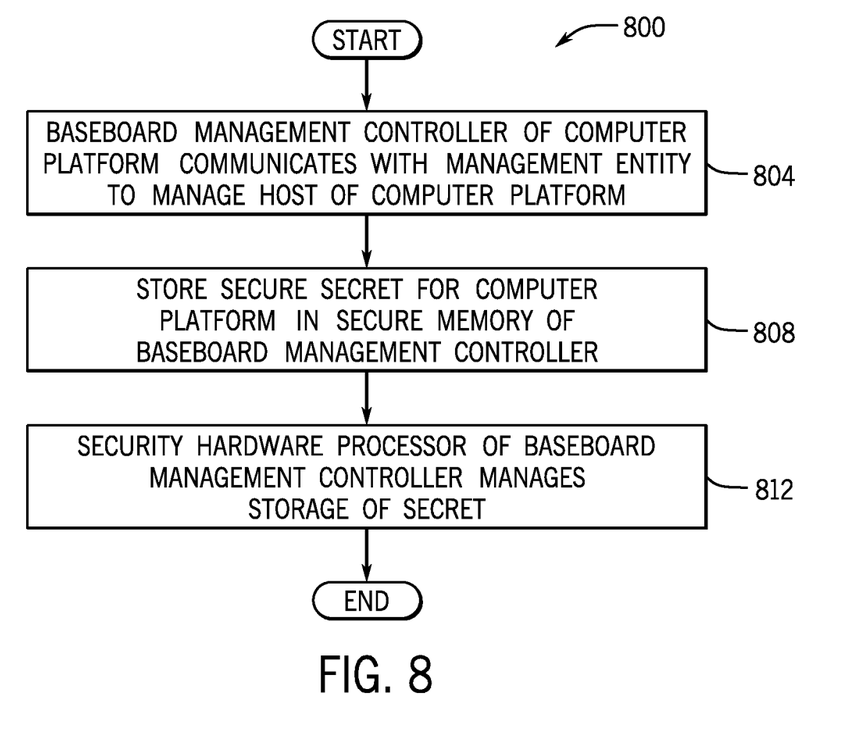
FIG. 8 is a flow diagram depicting a process to manage a secret stored in a secure memory of a BMC according to an example implementation.

Referring to FIG. 8, in accordance with example implementations, a process 800 includes a baseboard management controller of a computer platform communicating (block 804) with a management entity to manage a host of the computer platform. The process 800 includes storing (block 808) a secure secret for the computer platform in a secure memory of the baseboard management controller. The security hardware processor of the baseboard management controller manages (block 812) the storage of the secret.

Figure 9:
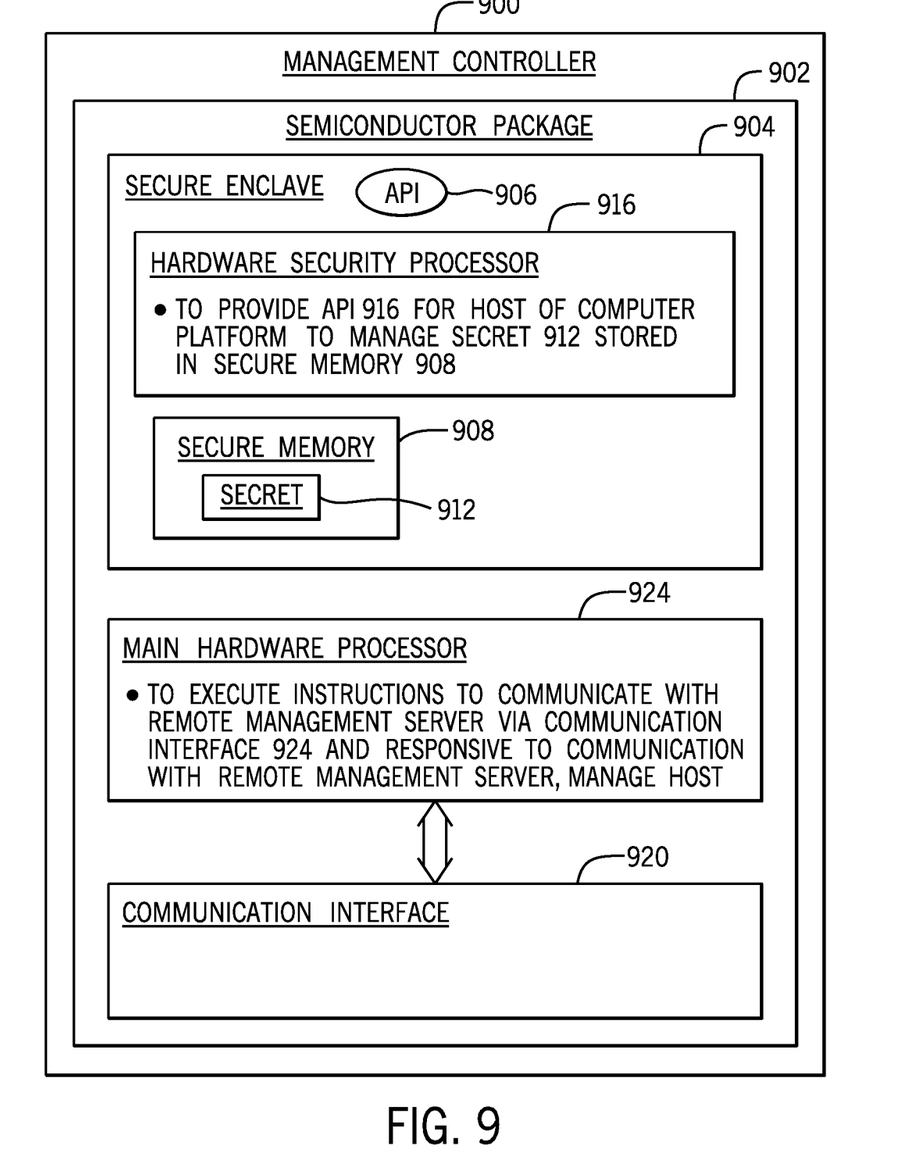
FIG. 9 is an illustration of machine-readable instructions stored on a non-transitory machine-readable storage medium to cause a machine to manage the storage of a secret in a secure memory of a management controller according to an example implementation.

Referring to FIG. 9, in accordance with example implementations, a semiconductor package 902 includes a main hardware processor 924 and a secure enclave 904. The secure enclave 904 includes a secure memory 908 and a hardware security processor 916. The management controller 900 further includes a communication interface 920. The main hardware processor 924 executes instructions to communicate with a remote management server via the communication interface 920, and responsive to the communications, manage a host of a computer platform. The hardware security processor 916 provides an application programming interface (API) 906 for the host to manage a secret 912 that is stored in the secure memory 908.

In accordance with example implementations, the main hardware processor serves as a proxy between the security hardware processor and the host. The proxy receives a request to manage the storage of the secret from a requestor of the host. The proxy forwards the request to the security hardware processor. The security hardware processor provides a response to the request to the proxy. The proxy forwards the response to the requestor. A particular advantage is that the proxy restricts access to the security hardware processor.

In accordance with example implementations, the main hardware processing core may provide a request to manage a secret of the baseboard management controller, which is stored in the secure memory. The security hardware processor manages the storage of the secret in response to the request. A particular advantage is that the baseboard management controller may store both secrets of the host and secrets of the baseboard management controller.

In accordance with example implementations, the memory includes terminals to communicate data, address and control signals with the memory; and none of the terminals are exposed outside of the semiconductor package. A particular advantage is that physical tampering may be prevented.

In accordance with example implementations, the semiconductor package may further include a first die that includes the memory and a second die that includes the security hardware processor. Moreover, the semiconductor package may include an interconnect to couple the first die and the second die. A particular advantage is that physical tampering may be prevented.

In accordance with example implementations, the second die may further include the main hardware processor. A particular advantage is that physical tampering may be prevented.

In accordance with example implementations, the security hardware processor executes instructions to provide an application programming interface to manage the storage of the secret. A particular advantage is that access to the security hardware processor is restricted.

In accordance with example implementations, the baseboard management controller further includes a secure enclave that has an associated cryptographic boundary. The security processor and the memory are inside the cryptographic boundary; and the main hardware processor is outside of the cryptographic boundary. A particular advantage is that access to the security hardware processor is restricted.

In accordance with example implementations, the management of the host by the baseboard management controller includes at least one of controlling a system power state of the host, controlling a boot path of the host, performing thermal management of the host, managing the use of virtual media by the host, controlling a boot of the host, performing security checks with the host, performing fault checks with the host, validating firmware that is executed by the second hardware processor, validating firmware executed by the security processor, performing fault recovery of the host, or providing a remote console for a remote management entity. A particular advantage is that the baseboard management may provide both management-related roles and security-related roles for the host.

While the present disclosure has been described with respect to a limited number of implementations, those skilled in the art, having the benefit of this disclosure, will appreciate numerous modifications and variations therefrom. It is intended that the appended claims cover all such modifications and variations.

What is claimed is:

1. An apparatus comprising:
a host; and
a baseboard management controller comprising a semiconductor package, wherein the semiconductor package comprises:
a secure enclave having an associated cryptographic boundary;
a memory inside the cryptographic boundary;
a main hardware processor outside of the cryptographic boundary, wherein the main hardware processor to cause the baseboard management controller to serve as an agent that, independently from the host, responds to communications with a remote management entity to manage the host; and
a security hardware processor inside the cryptographic boundary, wherein the security hardware processor is separate from the main hardware processor, and wherein the security hardware processor to manage a storage of a secret of a host in the memory.

2. The apparatus of claim 1, wherein:
the main hardware processor to serve as a proxy between the security hardware processor and the host;
the proxy to receive a request to manage the storage of the secret from a requestor of the host;
the proxy to forward the request to the security hardware processor;
the security hardware processor to provide a response to the request to the proxy; and
the proxy to forward the response to the requestor.

3. The apparatus of claim 1, wherein:
the main hardware processor to provide a request to manage the storage of a secret of the baseboard management controller in the memory; and
the security hardware processor to manage the secret in response to the request.

4. The apparatus of claim 1, wherein:
the memory comprises terminals to communicate data, address and control signals with the memory; and
none of the terminals are exposed outside of the semiconductor package.

5. The apparatus of claim 1, wherein the semiconductor package further comprises:
a first die comprising the memory;
a second die comprising the security hardware processor; and
an interconnect to couple the first die and the second die.

6. The apparatus of claim 5, wherein the second die further comprises the main hardware processor.

7. The apparatus of claim 1, wherein the security hardware processor to execute instructions to provide an application programming interface to manage the storage of the secret.

8. The apparatus of claim 1, wherein the semiconductor package further comprises a die comprising the memory, the security hardware processor, and the main hardware processor.

9. The apparatus of claim 1, wherein the secret comprises a cryptographic key, a certificate or a password.

10. The apparatus of claim 1, wherein the management of the host by the baseboard management controller comprises at least one of controlling a system power state of the host, controlling a boot path of the host, performing thermal management of the host, managing a use of virtual media by the host, controlling a boot of the host, performing security checks for the host, performing fault checks for the host, validating firmware executed by a second hardware processor, validating firmware executed by the security processor, performing fault recovery of the host, or providing a remote console for a remote management server.

11. A method comprising:
communicating, by a baseboard management controller of a computer platform, with a management entity to manage a host of the computer platform, wherein the baseboard management controller comprises a management plane and the management plane comprises a proxy;
storing a secure secret for the computer platform in a secure memory of the baseboard management controller;
managing, by a security hardware processor of the baseboard management controller, the storage of the secret, wherein the baseboard management controller further comprises a security plane and the security hardware processor is associated with the security plane;
receiving, by the proxy, a request from the host to manage the storage of the secret;
forwarding, by the proxy, the request to the security hardware processor;
providing, by the security hardware processor, a response to the request to the proxy; and
forwarding, by the proxy, the response to a requestor.

12. The method of claim 11, wherein communicating comprises at least one of controlling a system power state of the host, controlling a boot path of the host, performing thermal management of the host, managing a use of virtual media by the host, controlling a boot of the host, performing security checks for the host, performing fault checks for the host, validating firmware executed by a second hardware processor, validating firmware executed by the security processor, performing fault recovery of the host, or providing a remote console for the management entity.

13. The method of claim 11, wherein:
managing the storage of the secret comprises executing instructions, by the security hardware processor, associated with an application programming interface (API); and executing the instructions comprises the security hardware processor performing at least one of managing access to a cryptographic key, managing access to a key encrypting key, creating a key, storing a certificate, creating a certificate, deleting a certificate or updating a certificate.

14. The method of claim 11, wherein managing the storage of the secret comprises managing the storage of the secret inside a cryptographic boundary containing the security hardware processor and the secure memory.

15. A management controller comprising:
a semiconductor package comprising a main hardware processor and a secure enclave separate from the main hardware processor, wherein the secure enclave comprises a secure memory and a hardware security processor;
a communication interface;
wherein the main hardware processor to execute instructions to communicate with a remote management server via the communication interface and responsive to the communications, manage a host of a computer platform;
wherein the hardware security processor to provide an application programming interface (API) to manage a first secret of the host stored in the secure memory;
wherein the main hardware processor to serve as a proxy for the hardware security processor for a first request from the host directed to managing the first secret; and
wherein the main hardware processor to submit a second request to the hardware security processor directed to managing a second secret associated with the management controller.

16. The management controller of claim 15, wherein the semiconductor package further comprises:
a first die comprising the secure memory;
a second die comprising the hardware security processor and the main hardware security processor; and
an interconnect to couple the first die and the second die.

17. The management controller of claim 15, wherein:
the secure enclave has an associated cryptographic boundary;
the hardware security processor and the secure memory are inside the cryptographic boundary; and
the main hardware processor is outside of the cryptographic boundary.

* * * * *